United States Patent
Zander

[19]

[11] Patent Number: 5,774,756
[45] Date of Patent: Jun. 30, 1998

[54] CAMERA WITH FLEXIBLE FILM DEFLECTOR

[75] Inventor: Dennis R. Zander, Penfield, N.Y.

[73] Assignee: Eastman Kodak Company, Rochester, N.Y.

[21] Appl. No.: 909,602

[22] Filed: Aug. 12, 1997

[51] Int. Cl.⁶ .................................................... G03B 1/00
[52] U.S. Cl. .......................................... 396/415; 396/538
[58] Field of Search ................................... 396/387, 411, 396/415, 538; 242/332

[56] References Cited

U.S. PATENT DOCUMENTS

| | | | |
|---|---|---|---|
| 3,383,068 | 5/1968 | Winkler et al. | 396/415 X |
| 3,463,071 | 8/1969 | Winkler et al. | 396/415 |
| 3,479,938 | 11/1969 | Winkler et al. | 396/415 |
| 4,505,562 | 3/1985 | Hara et al. | 396/387 X |
| 4,530,582 | 7/1985 | Hara et al. | 396/387 X |
| 4,752,797 | 6/1988 | Sekine et al. | 396/387 |
| 5,255,034 | 10/1993 | Shimada et al. | 396/406 |
| 5,302,992 | 4/1994 | Fuss et al. | 396/442 |

FOREIGN PATENT DOCUMENTS 55-186576  12/1980  Japan .

OTHER PUBLICATIONS

JPO abstract of application JP 55–186576 and first page of drawings, Aug. 8, 1982.

*Primary Examiner*—Howard B. Blankenship
*Attorney, Agent, or Firm*—Roger A. Fields

[57] ABSTRACT

A camera comprising a backframe opening for exposing successive sections of a filmstrip, and a deflector supported at one end of the backframe opening for movement to permit a leading edge of the filmstrip which is advanced against the deflector to move the deflector away from the backframe opening to allow the leading edge to be advanced over the deflector rather than become trapped in the backframe opening, is characterized in that the deflector is flexible and has at least one fixed peripheral side and at least two adjacent free peripheral sides to permit the deflector to be flexed away from the backframe opening at the free peripheral sides, but not at the fixed peripheral side, when the leading edge of the filmstrip is advanced against the deflector.

5 Claims, 9 Drawing Sheets

CAMERA WITH FLEXIBLE FILM DEFLECTOR

CROSS REFERENCE TO RELATED APPLICATIONS

Reference is made to commonly assigned copending applications Ser. No. 08/910,162, entitled CAMERA WITH PIVOTABLE FILM DEFLECTOR HAVING INTEGRAL TORSION SPRING and filed Aug. 12, 1997 in the name of Dennis R. Zander, and Ser. No. 08/909,926, entitled CAMERA WITH FILM DEFLECTOR PIVOTABLE ABOUT INCLINED AXIS and filed Aug. 12, 1997 in the names of Dennis R. Zander and Robert L. Storey.

FIELD OF THE INVENTION

The invention relates generally to the field of photography, and in particular to cameras. More specifically, the invention relates to a camera capable of automatic film threading that has a film deflector for guiding the forward tip of a film leader from a film-exposure backframe opening to a film take-up chamber.

BACKGROUND OF THE INVENTION

Cameras capable of automatic film threading using a film cartridge that contains a filmstrip with a protruding, reduced-width, film leader have been available for a number of years. Usually, to load this type of camera, the film cartridge is manually inserted into a film supply chamber and the protruding film leader is manually placed over a film-exposure backframe opening that is located between the film supply chamber and a film take-up chamber. A sprocket wheel alongside the backframe opening is positioned for one of its teeth to be received in one of successive film perforations in the protruding film leader, to drivingly engage the film leader. When the camera is closed, the sprocket wheel is manually or automatically rotated to advance the protruding film leader into the film take-up chamber and to position the first available imaging section of the filmstrip in a film exposure plane at the backframe opening.

If the protruding film leader is relatively short, the leader's forward tip will not extend to the film take-up chamber when the film leader is manually placed over the backframe opening. Then, rotation of the sprocket wheel in driving engagement with the protruding film leader may cause the leader's forward tip to stub against a rigid, fixed partition wall that separates the backframe opening and the film take-up chamber. Consequently, the film leader may become trapped in the backframe opening, rather than being pushed over the partition wall and into the film take-up chamber. This is more likely to occur when the leader's forward tip is curled rather than flat.

To solve this problem, the partition wall can be supported for pivotal movement to serve as a film deflector (rather than being fixed). When the foward tip of the protruding film leader is pushed against the partition wall, the partition wall is pivoted away from the backframe opening and towards the film take-up chamber to allow the forward tip to be deflected over the partition wall instead of becoming trapped in the backframe opening. A relatively light return spring, which is weaker than the pushing force of the leader's forward tip against the partition wall, returns the partition wall to its original position after the leader's forward tip is advanced over the partition wall. This is shown for example in U.S. Pat. Nos. 3,479,938 issued Nov. 25, 1969, No. 4,530,582 issued Jul. 23, 1985, and No. 4,752,797 issued Jun. 21, 1988.

The Cross-Referenced Applications

Cross-referenced application Ser. No. 08/910,162 discloses a camera comprising a backframe opening for exposing successive sections of a filmstrip, a rigid deflector pivotally supported at one end of the backframe opening to permit a leading edge of the filmstrip which is advanced against the deflector to pivot the deflector away from the backframe opening to allow the leading edge to be advanced over the deflector rather than become trapped in the backframe opening, and a return spring which is weaker than the force of the leading edge against the deflector for returning the deflector to an original position. The deflector and the return spring are an integrally formed single piece.

Cross-referenced application Ser. No. 08/909,926 discloses a camera comprising a backframe opening for exposing successive sections of a filmstrip in a film exposure plane, and a deflector pivotally supported at one end of the backframe opening to permit a leading edge of the filmstrip to pivot the deflector away from the backframe opening to allow the leading edge to be advanced over the deflector rather than become trapped in the backframe opening. The deflector is supported to be pivoted about an inclined axis that extends at an acute angle with respect to the film exposure plane.

SUMMARY OF THE INVENTION

A camera comprising a backframe opening for exposing successive sections of a filmstrip, and a deflector supported at one end of the backframe opening for movement to permit a leading edge of the filmstrip which is advanced against the deflector to move the deflector away from the backframe opening to allow the leading edge to be advanced over the deflector rather than become trapped in the backframe opening, is characterized in that:

the deflector is flexible and has at least one fixed peripheral side and at least two adjacent free peripheral sides to permit the deflector to be flexed away from the backframe opening at the free peripheral sides, but not at the fixed peripheral side, when the leading edge of the filmstrip is advanced against the deflector.

DETAILED DESCRIPTION OF THE INVENTION

The invention is disclosed as being embodied preferably in a camera capable of automatic film threading. Because the features of a camera capable of automatic film threading are generally known, as shown for example in U.S. Pat. Nos. 3,479,938 issued Nov. 25, 1969, No. 4,530,582 issued Jul. 23, 1985, and No. 4,752,797 issued Jun. 21, 1988, the description which follows is directed in particular only to those elements forming part of or cooperating directly with the disclosed embodiment. It is to be understood, however, that other elements may take various forms known to a person of ordinary skill in the art.

Figure 1:
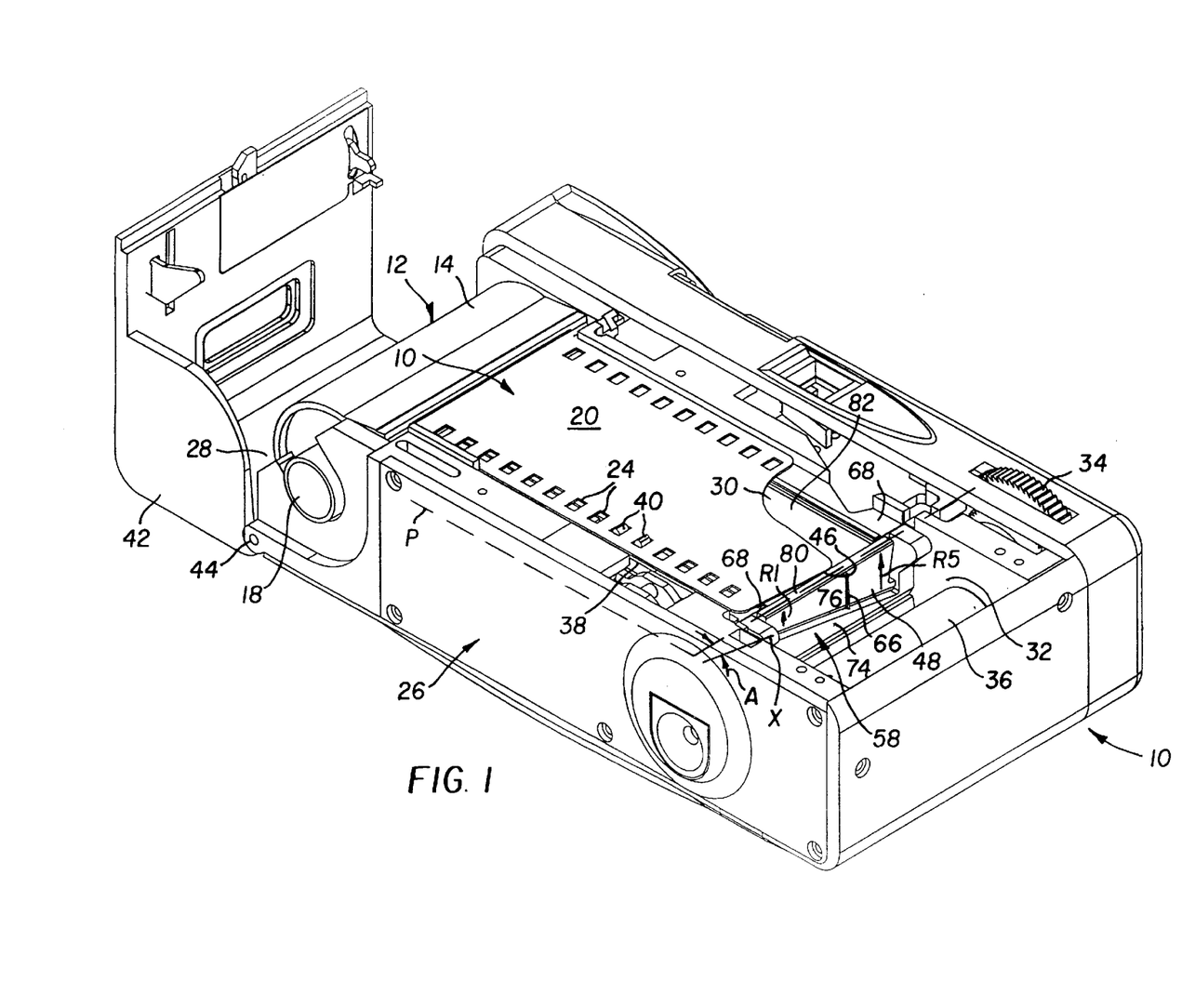
FIG. 1 is a rear perspective view of a self-threading camera which includes one embodiment of a film deflector and a support bracket for the film deflector, showing the film deflector in an original non-deflected position.
Figure 2:
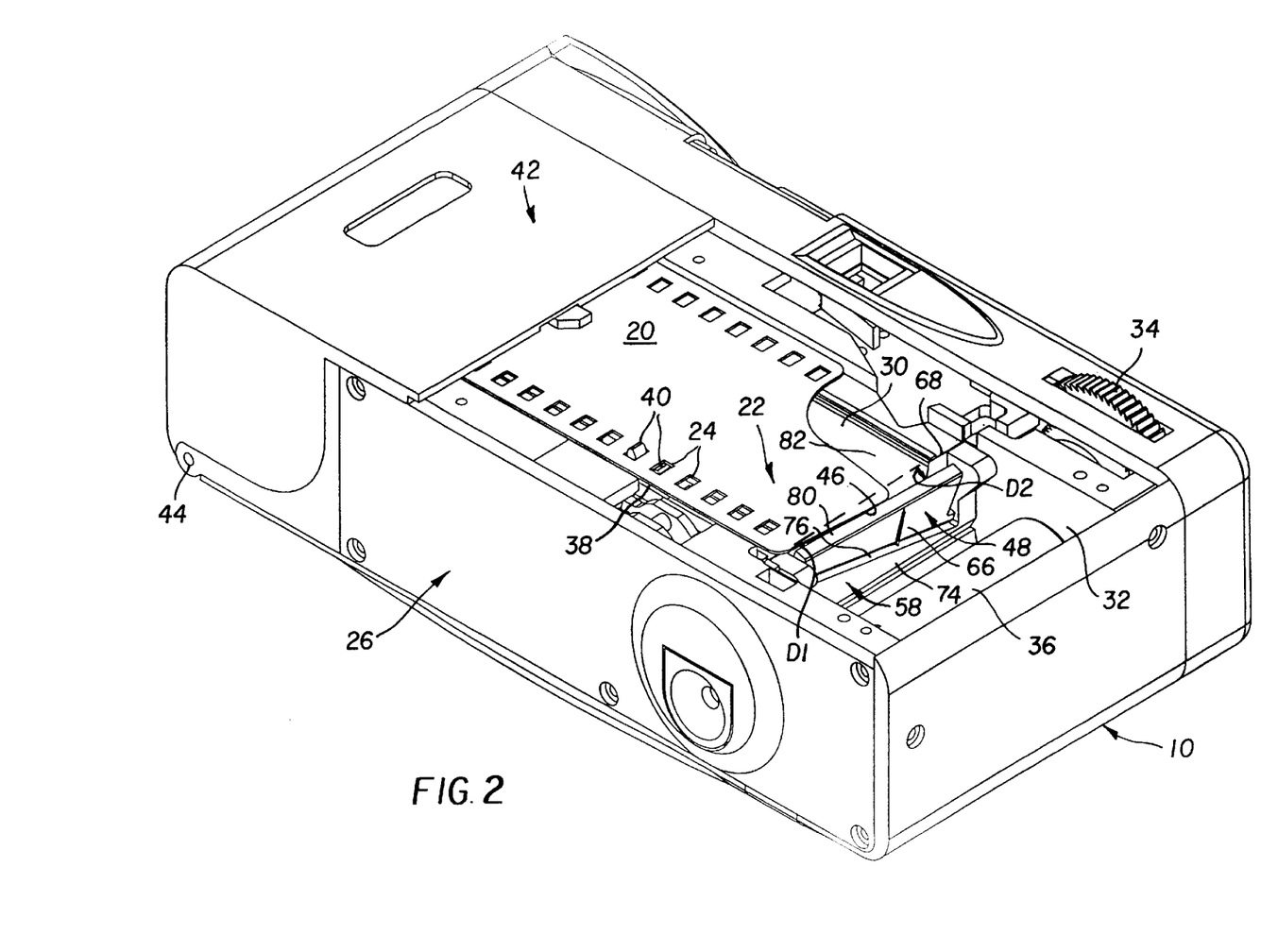
FIG. 2 is a rear perspective view of the camera illustrated in FIG. 1, showing the film deflector in a deflected position.
Figure 3:
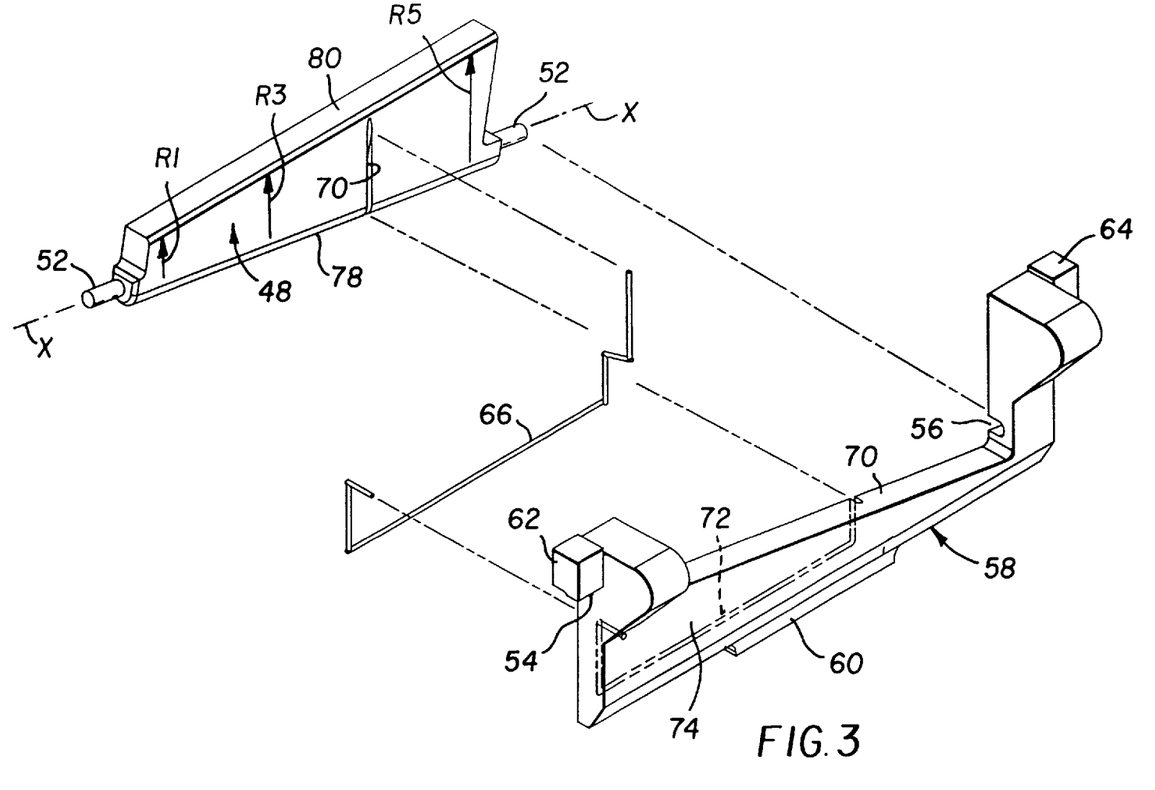
FIG. 3 is an exploded perspective view of the film deflector and the support bracket, together with a separate return spring.

First Embodiment (FIGS. 1–3)

Referring now to the drawings, FIGS. 1 and 2 partially show a camera 10 capable of automatic film threading. The camera 10 is shown without a rear cover part to illustrate elements that could not otherwise be seen.

The camera 10 can used with a conventional 35mm film cartridge 12 comprising a light-tight housing 14 and an initially unexposed filmstrip 16. The filmstrip 16 is supported in a roll on a rotatable spool 18 inside the light-tight housing 14 and has a film leader 20 that protrudes outwardly several inches from a light-trapping slot (not shown) in the housing. A forward-most portion 22 of the film leader 20 has a reduced width as compared to the remainder of the filmstrip 16. The filmstrip 16 including the film leader 20 has successive edge perforations 24.

The camera 10 includes a main body part 26 having a cartridge receiving chamber 28, a film-exposure backframe opening 30 at which successive sections of the filmstrip 16 are exposed in a film exposure plane P, and an exposed film take-up chamber 32. See FIGS. 1 and 2. A manually rotatable film wind thumbwheel 34 is rotationally connected to an exposed film take-up spool 36 rotatably supported within the exposed film take-up chamber 32 and is rotationally connected to a multi-toothed film drive sprocket wheel 38 rotatably supported alongside the backframe opening 30.

To load the camera 10, the film cartridge 12 is inserted into the cartridge receiving chamber 28, and the protruding film leader 20 is placed over the backframe opening 30. See FIG. 1. The protruding film leader 20 is positioned to receive at least one of the teeth 40 of the sprocket wheel 38 in at least one of the film perforations 24 in the film leader, to drivingly engage the film leader. A rear door 42 pivotally connected to the main body part 26 at the pivot pin 44 is manually closed to seal the cartridge receiving chamber 28. See FIG. 2. Then, the sprocket wheel 34 is manually rotated to rotate the sprocket wheel 38 and the take-up spool 36, first to advance the protruding film leader 22 to the take-up spool and second to position the first available imaging section of the filmstrip 16 in the film exposure plane P at the backframe opening 30.

If the protruding film leader 20 is relatively short as in FIGS. 1 and 2, the leader's forward tip or leading edge 46 will not extend to the take-up chamber 32 when the film leader is placed over the backframe opening 30. Then, rotation of the sprocket wheel 34 in driving engagement with the protruding film leader 20 can cause the leader's forward tip 46 to stub against a rigid deflector 48 that separates the backframe opening 30 and the film take-up chamber 32. Consequently, the film leader 20 may become trapped in the backframe opening 30, rather than be pushed over the deflector 48 and into the take-up chamber 32. This is more likely to occur when the leader's forward tip 46 is curled rather than flat.

To solve this problem, the deflector 48 is supported for pivotal movement at upper and lower coaxial pivot pins 50 and 52 that are rotatably supported within respective upper and lower support holes 54 and 56 in a support bracket 58. See FIG. 3. The support bracket 58 has a center projection 60 that sits in a slot (not shown) in the main body part 26 and a pair of end projections 62 and 64 that sit in cavities (not shown) in the main body part, to affix the support bracket to the main body part. When the forward tip 46 of the protruding film leader 20 is pushed against the deflector 48, the deflector is pivoted away from the backframe opening 30 and towards the take-up chamber 32, as shown in FIG. 2, to allow the forward tip to be deflected over the deflector instead of becoming trapped in the backframe opening. A relatively light torsion return spring 66, which is weaker than the pushing force of the leader's forward tip 46 against the deflector 48, returns the deflector to its original non-deflected position against a pair of stops 68, after the leader's forward tip is advanced over the deflector. See FIG. 1. The return spring 66 is captively held in a groove 70 in the deflector 48 and in a groove 72 in the support bracket 58, as shown in FIG. 3.

As shown in FIGS. 1–3, the deflector 48 is pivotable about an inclined axis X. The inclined axis X extends at an acute angle A of 10° with respect to the film exposure plane P, but an acceptable angular range is 5°–30°. See FIG. 1.

As shown in FIG. 3, the support bracket 58 has a fixed partition wall 74 with an inclined edge 76 that extends parallel to the inclined axis X. The deflector 48 has an inclined edge 78 that is curved widthwise and extends parallel to and is located adjacent the inclined edge 76 of the partition wall 74, and it has a non-inclined edge 80 that extends parallel to the film exposure plane P. See FIG. 1. The deflector 48 has uniformly-increasing-length turning radii R1'''R3'''R5 which extend from the inclined axis X perpendicularly to the non-inclined edge 80 of the deflector. See FIG. 3. The uniformly-increasing-length turning radii R1'''R3'''R5 increase in length as the inclined axis X inclines farther from the film exposure plane P. See FIG. 1. When the deflector 48 is pivoted as shown in FIG. 2, the non-inclined edge 80 of the deflector is moved a greater distance D1 at one end of the deflector and a lesser distance D2 at another end of the deflector.

The forward-most portion 22 of the protruding film leader 20 is provided with a leader region 82 that is cut-away to make the forward-most portion have the reduced width. As shown in FIGS. 1 and 2, the inclined axis X is positioned to be inclined farthest from the forward-most portion 22 of the protruding film leader 20 opposite the leader region 82 that is cut-away.

Figure 4:
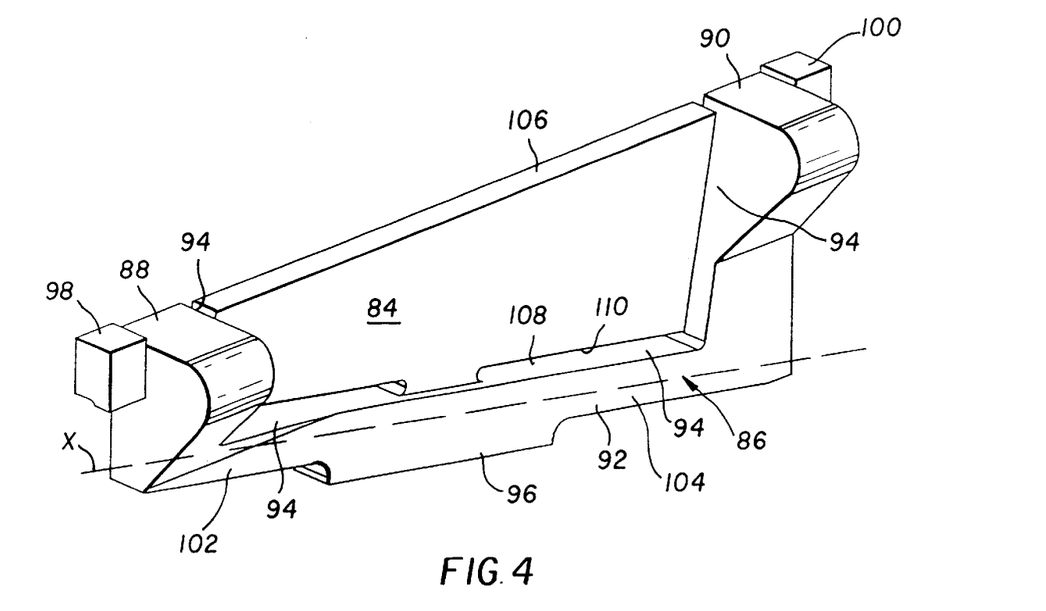
FIG. 4 is a perspective view of another embodiment of a film deflector and a support bracket, showing the film deflector in an original non-deflected position.
Figure 5:
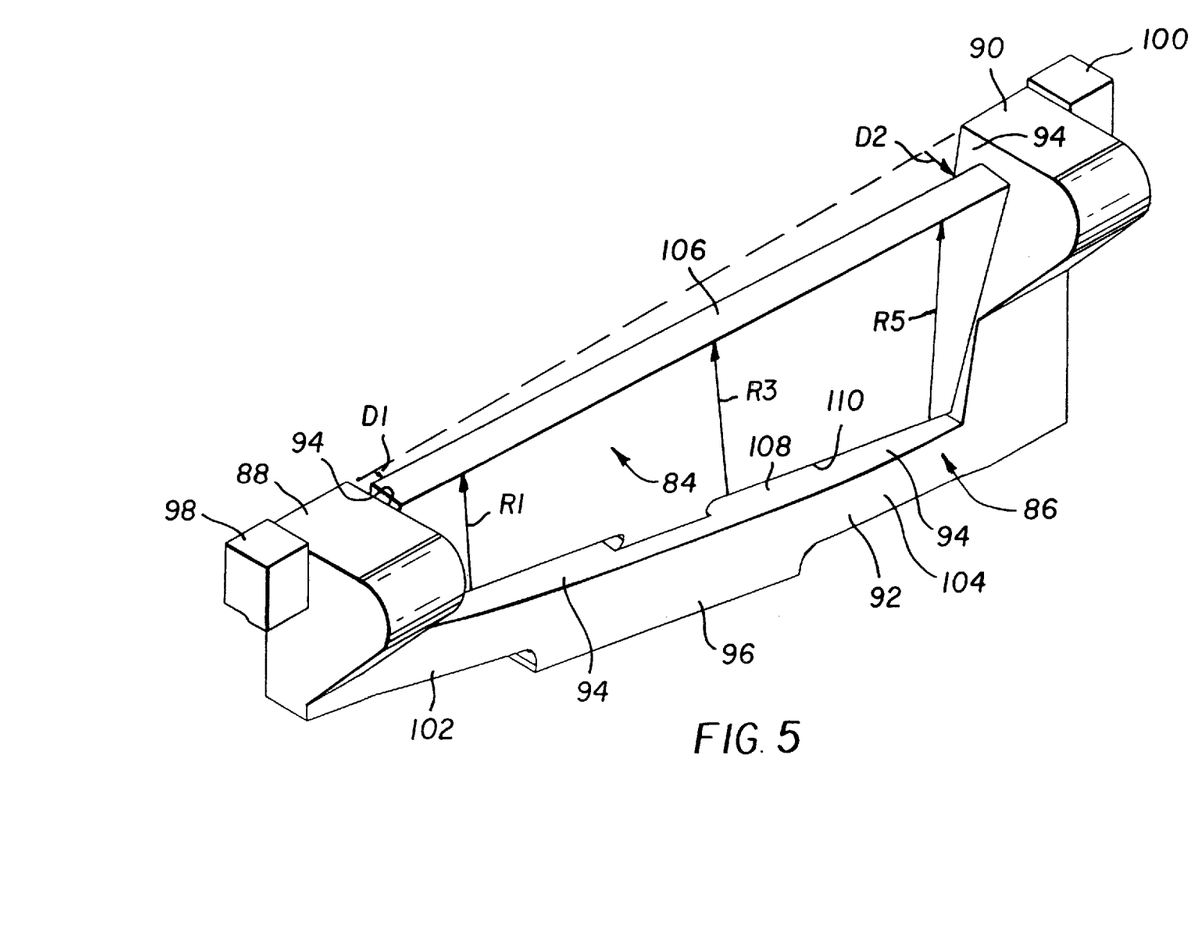
FIG. 5 is a perspective view of the other embodiment of the film deflector and the support bracket, showing the film deflector in a deflected position.

Second Embodiment (FIGS. 4 and 5)

FIGS. 4 and 5 show a rigid deflector 84 and a support bracket 86 that can be used in the camera 10 in place of the deflector 48 and the support bracket 58 shown in FIGS. 1–3. To the extent not mentioned, the deflector 84 and the support bracket 86 are similar to the deflector 48 and the support bracket 58.

The deflector 84 and the support bracket 86 are an integrally formed single piece. As shown in FIGS. 4 and 5, the support bracket 86 has a pair of opposite arms 88 and 90 and an interconnecting base 92 which collectively define a longitudinal space 94 for the deflector. The deflector 84 is positioned in the space 94 separated from the arms 88 and 90 and united with the base 92 at a center portion 96 of the base. The center portion 96 of the base 92 sits in a slot (not shown) in the main body part 26 and a pair of end projections 98 and 100 of the arms 88 and 90 sit in cavities (not shown) in the main body part, to establish a three-point connection of the support bracket 86 with the main body part. The base 92 has respective resilient torsion portions 102 and 104 between the center portion 96 and the arms 88 and 90 which can be torsionally twisted to permit the deflector 84 to be pivoted about the inclined axis X as shown in FIG. 5.

When the forward tip 46 of the protruding film leader 20 is pushed against the deflector 84, the deflector is pivoted away from the backframe opening 30 and towards the take-up chamber 32, to allow the forward tip to be deflected over the deflector instead of becoming trapped in the backframe opening. As shown in FIG. 5, a non-inclined edge 106 (parallel to the film exposure plane P) of the deflector 84 is moved a greater distance D1 at one end of the deflector and a lesser distance D2 at another end of the deflector, similar to the greater and lesser distances D1 and D2 the non-inclined edge 80 of the deflector 48 is moved in FIG. 2. The torsion portions 102 and 104 of the base 92 are weaker than the pushing force of the leader's forward tip 46 against the deflector 84. This enables the torsion portions 102 and 104 to serve as a return spring which returns the deflector 84 to its original non-deflected position against the pair of stops 68, after the leader's forward tip 46 is advanced over the deflector.

The support bracket 86 has an inclined edge 108 that extends parallel to the inclined axis X and to an inclined edge 110 of the deflector 84 which faces the inclined edge 108. The deflector 84 has uniformly-increasing-length turning radii R1'''R3'''R5 which extend from the inclined axis X perpendicularly to the non-inclined edge 106 of the deflector. See FIG. 5. The uniformly-increasing-length turning radii R1'''R3'''R5 increase in length as the inclined axis X inclines farther from the film exposure plane P.

Third Embodiment (FIGS. 6–9)

FIGS. 6–9 show a flexible deflector 112 and a support bracket 114 that can be used in the camera 10 in place of the deflector 48 and the support bracket 58 shown in FIGS. 1–3.

Figure 6:
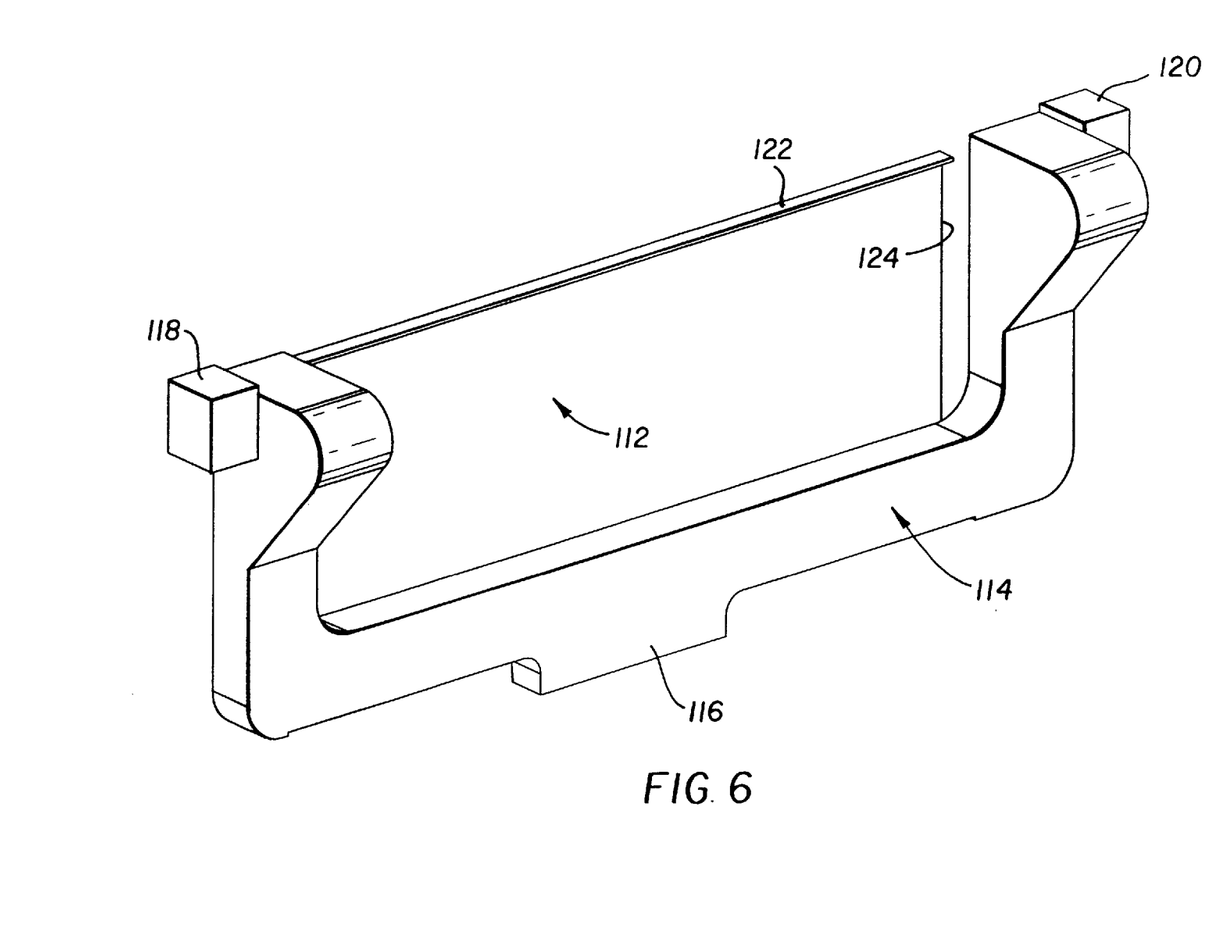
FIG. 6 is a perspective view of a third embodiment of a film deflector and a support bracket, showing the film deflector in an original non-deflected position.
Figure 7:
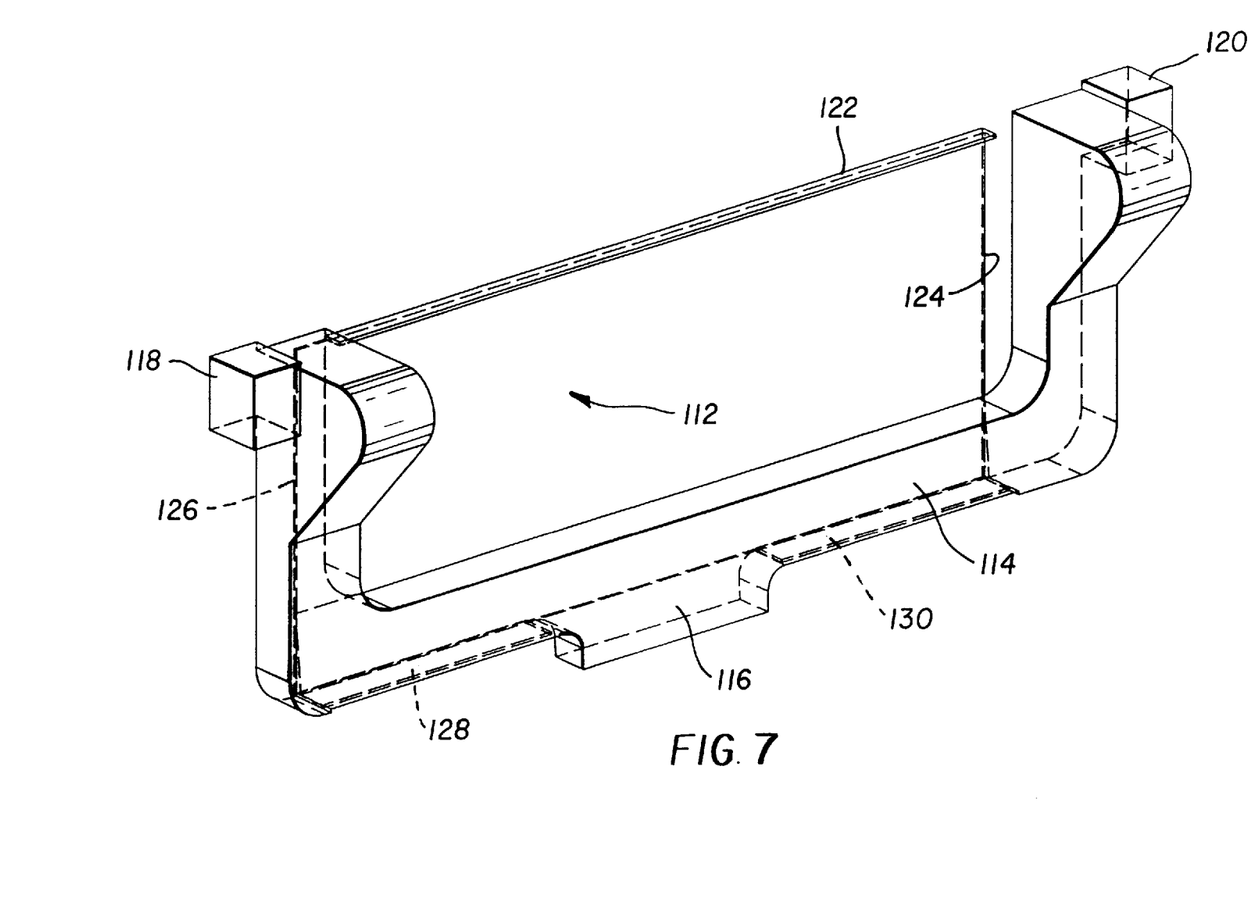
FIG. 7 is a perspective view similar to FIG. 6, showing hidden lines.
Figure 8:
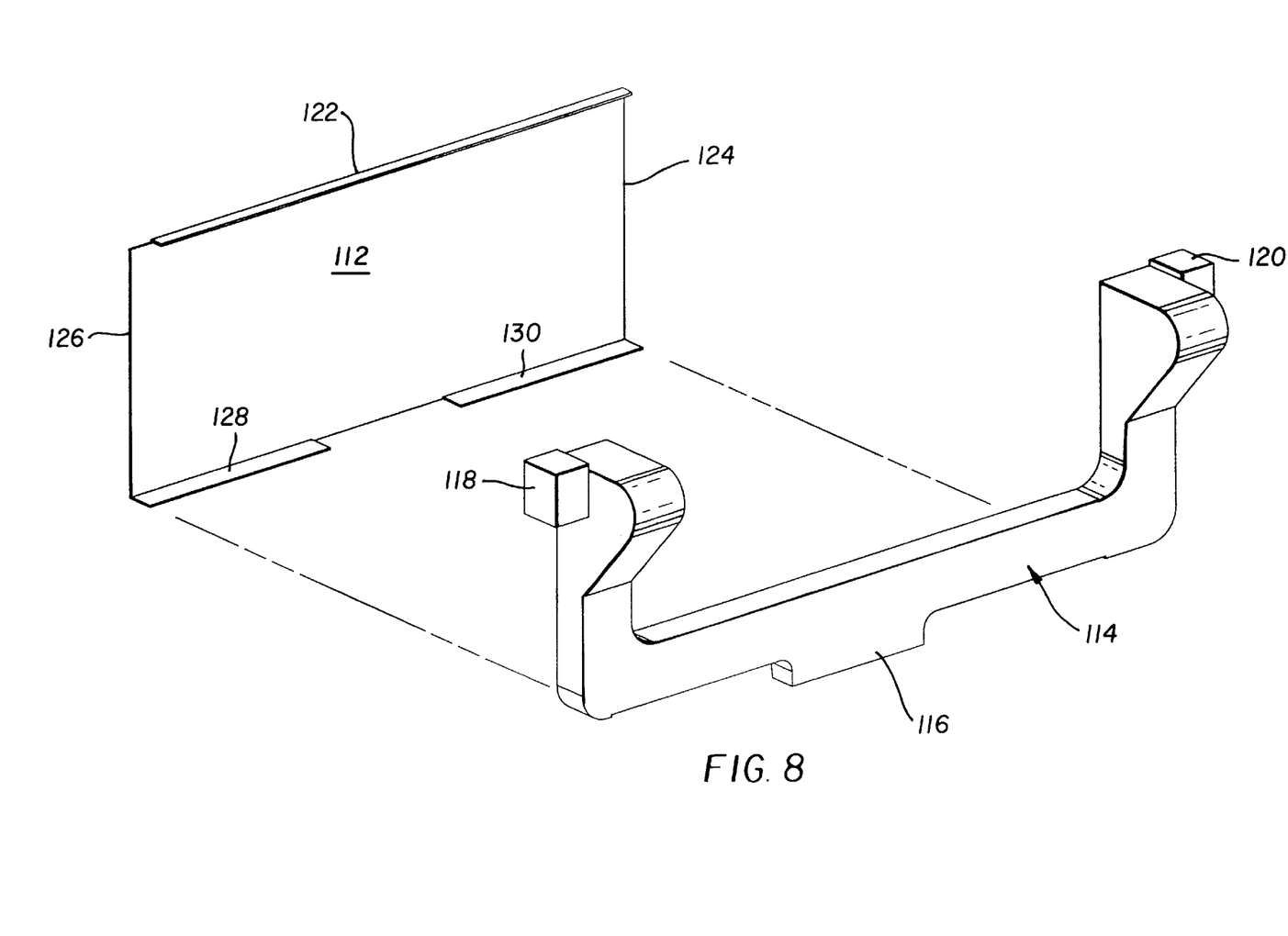
FIG. 8 is an exploded perspective view of the third embodiment of the film deflector and the support bracket.
Figure 9:
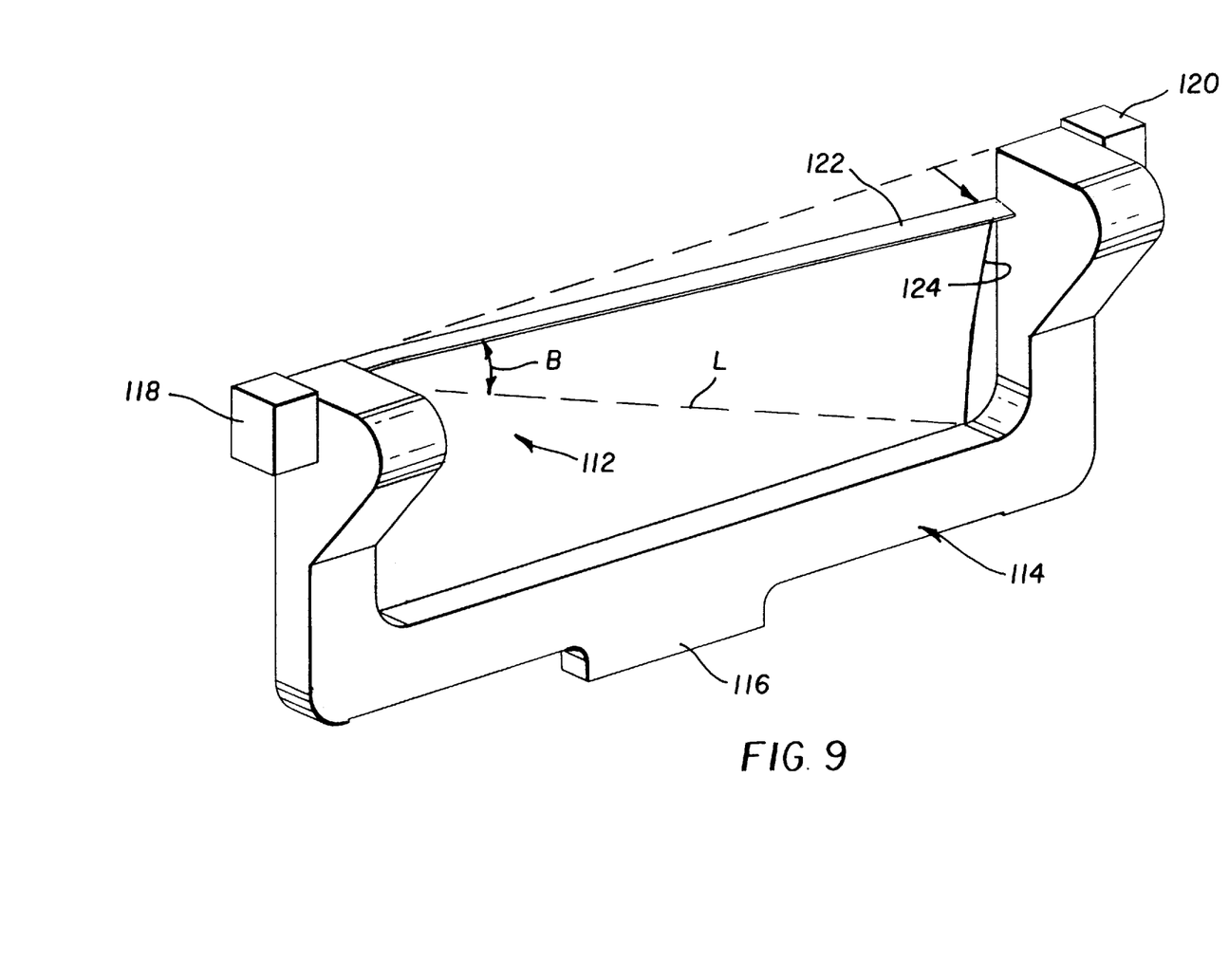
FIG. 9 is a perspective view of the third embodiment of the film deflector and the support bracket, showing the film deflector in a deflected position.

The support bracket 114 has a center projection 116 that sits in a slot (not shown) in the main body part 26 and a pair of end projections 118 and 120 that sit in cavities (not shown) in the main body part, to affix the support bracket to the main body part. The deflector 112 has two right-angled longitudinal edge portions 122 and 124 that are spaced from the support bracket 114, to be free edge portions with respect to the support bracket, and two right-angled longitudinal edge portions 126 and 128 that overlap the support bracket in fixed relation. A third longitudinal edge portion 130 of the deflector 112, in-line with the longitudinal edge portion 128, overlaps the support bracket in fixed relation.

When the forward tip 46 of the protruding film leader 20 is pushed against the deflector 112, the deflector is flexed along a line of flexure L away from the backframe opening 30 and towards the take-up chamber 32, to allow the forward tip to be deflected over the deflector instead of becoming trapped in the backframe opening. See FIG. 9. The line of flexure extends at an acute angle B with respect to the film exposure plane P.

The invention has been described with reference to a preferred embodiment. However, it will be appreciated that variations and modifications can be effected by a person of ordinary skill in the art without departing from the scope of the invention.

PARTS LIST 10. camera
12. film cartridge
14. light-tight housing
16. filmstrip
P. film exposure plane
18. cartridge spool
20. film leader
22. forward-most leader portion
24. film edge perforations
26. main body part
28. cartridge receiving chamber
30. film-exposure backframe opening
32. film take-up chamber
34. film wind thumbwheel
36. film take-up spool
38. film drive sprocket wheel
40. sprocket teeth
42. rear door
44. pivot pin
46. leader's forward tip or leading edge
48. rigid deflector
50. upper pin
52. lower pin
54. upper support hole
56. lower support hole
58. support bracket
60. center projection
62. end projection
64. end projection
66. return spring
68, 68. stops
X. inclined axis
A. acute angle
70. groove
72. groove
74. partition wall
76. inclined edge
78. inclined edge
80. non-inclined edge
R1, R3, R5. uniformly-increasing-length turning radii
D1. greater distance
D2. lesser distance
82. cut away leader region
84. rigid deflector
86. support bracket
88. arm
90. arm
92. base
94. space
96. center portion
98. end projection
100. end projection
102. torsion portion
104. torsion portion
106. non-inclined edge
108. inclined edge
110. inclined edge
112. flexible deflector
114. support bracket
116. center projection
118. end projection
120. end projection 122. free edge portion
124. free edge portion
126. fixed edge portion
128. fixed edge portion
130. fixed edge portion
L. line of flexure
B. acute angle

What is claimed is:

1. A camera comprising a backframe opening for exposing successive sections of a filmstrip, and a deflector supported at one end of said backframe opening for movement to permit a leading edge of the filmstrip which is advanced against said deflector to move said deflector away from the backframe opening to allow the leading edge to be advanced over the deflector rather than become trapped in the backframe opening, is characterized in that:

said deflector is flexible and has at least one fixed peripheral side and at least two adjacent free peripheral sides to permit the deflector to be flexed away from said backframe opening at said free peripheral sides, but not at said fixed peripheral side, when the leading edge of the filmstrip is advanced against the deflector.

2. A camera as recited in claim 1, wherein said deflector is resilient to return the deflector to an original position after the leading edge of the filmstrip is advanced over the deflector.

3. A camera as recited in claim 1, wherein said adjacent sides meet at right angles.

4. A camera as recited in claim 1, wherein said deflector has two adjacent fixed peripheral sides that meet at right angles and two adjacent free peripheral sides that meet at right angles to form the deflector in a rectangle.

5. A camera comprising a backframe opening for exposing successive sections of a filmstrip in a film exposure plane, and a deflector supported at one end of said backframe opening to permit a leading edge of the filmstrip which is advanced against said deflector to move the deflector away from the backframe opening to allow the leading edge to be advanced over the deflector rather than become trapped in the backframe opening, is characterized in that:

said deflector is flexible and has two adjacent fixed peripheral sides and two adjacent free peripheral sides to permit the deflector to be flexed away from said backframe opening at said free peripheral sides along an inclined line of flexure that extends at an acute angle with respect to the film exposure plane, but not to be flexed away from the backframe opening at said fixed peripheral sides, when the leading edge of the filmstrip is advanced against the deflector.

* * * * *